United States Patent [19]
Major

[11] Patent Number: 5,967,880
[45] Date of Patent: *Oct. 19, 1999

[54] METHOD AND APPARATUS FOR ULTRASONICALLY TEXTURING ABS OF MAGNETIC HEAD OF HARD DISK DRIVE

[75] Inventor: John C. Major, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/780,152

[22] Filed: Jan. 3, 1997

[51] Int. Cl.$^6$ ................................ B24B 1/00; B24C 1/00
[52] U.S. Cl. ................................ 451/36; 451/165; 451/56
[58] Field of Search ................................ 451/5, 56, 165, 451/11, 27, 36, 37, 164

[56] References Cited

U.S. PATENT DOCUMENTS

| | | | |
|---|---|---|---|
| 2,580,716 | 1/1952 | Balamuth | 451/164 |
| 4,071,385 | 1/1978 | Kuris | 156/73.1 |
| 4,343,111 | 8/1982 | Inoue | 451/165 |
| 5,010,429 | 4/1991 | Taguchi et al. | 360/103 |
| 5,079,657 | 1/1992 | Aronoff et al. | 360/103 |
| 5,162,073 | 11/1992 | Aribiff et al. | 156/625 |
| 5,230,182 | 7/1993 | Daniell et al. | 451/165 |
| 5,347,412 | 9/1994 | Nitta et al. | 360/103 |
| 5,478,270 | 12/1995 | Cuomo et al. | 451/5 |

*Primary Examiner*—Timothy V. Eley
*Assistant Examiner*—Derris Holt Banks
*Attorney, Agent, or Firm*—Gray Cary Ware & Freidenrich

[57] ABSTRACT

A method and apparatus for texturing the air bearing surface (ABS) of a magnetic head of a hard disk drive includes juxtaposing the ABS with an ultrasonically-driven sonitrode having a diamond die end. An alumina slurry is disposed between the sonitrode and ABS at a slight pressure, with the slurry having a grit size of less than one micron. The sonitrode is then vibrated to agitate the slurry and thereby texture the head. If desired, a cavity can be formed in the die, with the cavity being a mirror image of a portion of the head, e.g., the sensing element, that is not intended to be textured.

17 Claims, 2 Drawing Sheets

METHOD AND APPARATUS FOR ULTRASONICALLY TEXTURING ABS OF MAGNETIC HEAD OF HARD DISK DRIVE

BACKGROUND OF THE INVENTION

1. Field of the Invention

The present invention relates generally to magnetic heads for data storage devices, and more particularly to methods and apparatus for reducing stiction between the air bearing surface (ABS) of a magnetic head and the storage medium of a data storage device.

2. Description of the Related Art

In data storage devices such as computer hard disk drives, inductive thin film magnetic head assemblies are normally used for implementing read/write functions. When the disks of a hard disk drive are rotated, a surface of each disk carries a thin film of air, referred to in the art as an "air bearing". This air bearing supports the magnetic head assembly, and more particularly it supports the surface of the head assembly that is most closely juxtaposed with the disk. Accordingly, the surface of the head assembly closest to the disk is referred to as the "air bearing surface" (ABS) of the head. The head's sensing element itself usually is recessed a short distance from the ABS of the head assembly. Although in reality the disk rotates past the head, the head, from the point of view of the disk, "flies" over the disk at some height, referred to as the "flying height".

It happens that it is desirable that the sensing element and, thus, the ABS, of the head be positioned as closely as possible above the disk during read/write operations, because the data capacity of the disk drive increases as the distance between the sensing element and disk decreases. In other words, it is advantageous that the flying height in a hard disk drive be as low as possible. Accordingly, methods and apparatus have been developed for lowering the height at which the ABS of a head "flies" above a disk of a disk drive.

An example of such is disclosed in my U.S. Pat. No. 5,478,270, assigned to the same assignee as the present invention and incorporated herein by reference. In my above-incorporated patent, I disclose a method employing ultrasonic means for precisely machining complex patterns of slider rails at the substrate level to establish the ABS of a head, the complex patterns permitting very close juxtaposition of the ABS and a disk of a disk drive. The high precision of the rail patterns supports a very low flying height and, thus, increases the data capacity of the hard disk drive.

One significant problem in disk drives that incorporate sliders with very planar surfaces is the stiction caused by contact or close proximity of the slider and disk surfaces. Stiction can cause drive failure.

One way to reduce stiction between the ABS of a head and the surface of a disk is to slightly texture, i.e., roughen, the surface of the disk. As can be readily understood, such texturing must be very precisely accomplished, to avoid damaging the disk.

As an alternative to texturing the entire disk, previous attempts have been made to texture only the ABS of a head. For example, U.S. Pat. No. 5,347,412 attempts to texture a head by sputtering or by making the head from a two-phase, intrinsically textured material. In contrast, U.S. Pat. No. 5,079,657 contemplates chemical etching methods. I, however, have recognized that while the ultrasonic method and apparatus disclosed in my above-incorporated patent were directed to lapping the ABS to a very smooth finish, and then subsequently machining a pattern in an ABS, the principles of my previous invention as inventively modified herein can also be used to slightly roughen the ABS with a high degree of precision and uniformity. Indeed, as recognized by the present invention, ultrasonic texturing of a head has the advantage of being inexpensive yet precise in texturing only the ABS of a head while avoiding unwanted texturing of the sensing element itself, unlike other methods which rely on sputtering or dual-phase ABS.

Accordingly, it is an object of the present invention to provide a method and apparatus for ultrasonically texturing the ABS of a magnetic head. Another object of the present invention is to provide a method and apparatus for uniformly texturing the ABS of a magnetic head. Yet another object of the present invention is to provide a method and apparatus for texturing the ABS of a magnetic head, without unduly damaging sensitive portions of the head, such as the sensing element. Still another object of the present invention is to provide a method and apparatus for texturing the ABS of a magnetic head that is easy to use and cost-effective.

SUMMARY OF THE INVENTION

A method is disclosed for texturing the air bearing surface (ABS) of a magnetic head to thereby reduce stiction between the head and a hard disk when the head is juxtaposed with the disk. The method includes providing a sonitrode, and juxtaposing the sonitrode with the head. An abrasive slurry is then disposed between the ABS and the sonitrode. Next, the sonitrode is vibrated to thereby texture the ABS.

In a preferred embodiment, the abrasive slurry includes alumina, and has a grit size of less than one micron and preferably less than one-half micron. As discussed in detail below, to uniformly texture the ABS without unduly damaging the ABS, the slurry pressure during the vibrating step is less than one quarter of a kilogram (force) (0.25 kg) over the area of the head substrate.

In some embodiments, the head includes a non-textured portion, e.g., a sensing element. Accordingly, the sonitrode is formed with a cavity, and the cavity is a mirror image of the non-textured portion to avoid texturing the non-textured portion during the vibrating step. If desired, the sonitrode can be juxtaposed with a plurality of heads for texturing the heads simultaneously. A head textured by the above-discussed process is also disclosed, as is a hard disk drive incorporating the head and a computer incorporating the hard disk drive.

In another aspect, a method for texturing the air bearing surface (ABS) of a head for reducing stiction between the head and a disk includes ultrasonically agitating a slurry such that the slurry textures the ABS without machining a pattern in the ABS.

In yet another aspect of the present invention, an apparatus for texturing the air bearing surface (ABS) of a magnetic head includes a sonitrode and a slurry having a grit size of less than one micron. Also, the apparatus includes a holder engaged with the head such that the head is juxtaposed with the sonitrode with the slurry disposed between the head and sonitrode at a slight pressure.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF THE PREFERRED EMBODIMENTS

Figure 1:
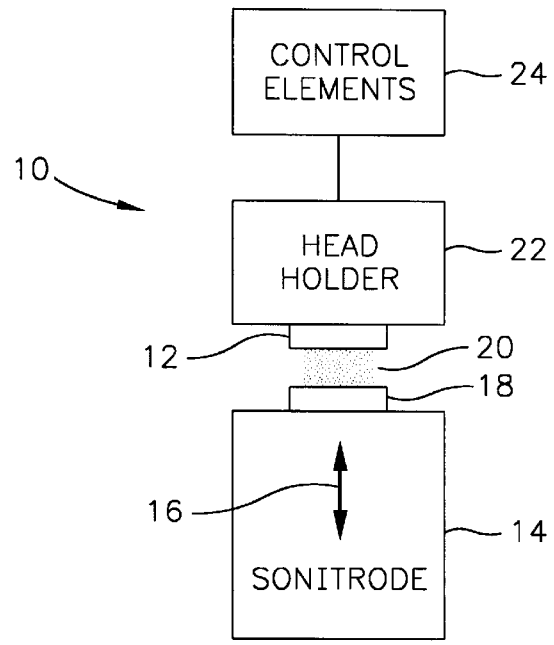
FIG. 1 is a schematic view of an exemplary magnetic head texturing apparatus.

Referring initially to FIG. 1, an apparatus is shown, generally designated 10, for texturing the air bearing surface (ABS) of one or more magnetic head sliders, referred to herein simply as "heads", on a slider row, referred to herein as a head substrate 12. The texturing reduces stiction between each head and a respective electronic data storage hard disk (not shown in FIG. 1) when the heads are separated from the head substrate 12, mounted in a respective hard disk drive, and a disk is rotated just beneath the head. As discussed below the apparatus 10 can simultaneously texture a plurality of heads.

As shown in FIG. 1, the apparatus 10 includes a sonitrode 14 positioned beneath the head substrate 12. In accordance with principles well-known in the art, the sonitrode 14 is ultrasonically vibrated in the longitudinal directions indicated by the arrows 16. Preferably, the sonitrode 14 is vibrated at about twenty kiloHertz (20 kHz) (with a magnitude of from five to 20 micrometers for a period of time that varies preferably from two seconds to one minute.

As further shown, the sonitrode 14 includes a diamond-tipped die 18, details of which are discussed further below. An abrasive grit-bearing water-based slurry 20 is disposed between the die 18 and head substrate 12 at a relatively lower fluid pressure than that disclosed in the above-incorporated U.S. patent, preferably at or below one quarter of a kilogram (force) (0.25 kg) over the area of the head substrate 12. As recognized by the present invention, the grit of the slurry 20 is less than one micron, and more preferably is about one-tenth of a micron, i.e., the grit is significantly smaller than that disclosed in the above-incorporated patent.

Furthermore, the grit of the slurry 20 is made of a material that is marginally harder than the material of the ABS of the magnetic head to be textured, but not as hard as the carbide materials disclosed in the above-incorporated patent. This is because the heads herein are not to be machined, but gently textured. Consequently, the grit should be harder than the head material but not as hard as carbide, to avoid damaging the head material. Accordingly, in the preferred embodiment the grit has hardness of between nineteen hundred Knoop units and twenty four hundred Knoop units (1900–2400). Alumina is an acceptable grit material having a hardness in this range.

The present invention's use of a smaller, softer grit at lower fluid pressure, as compared to the disclosure in the above-incorporated U.S. patent, is necessary because the present invention is directed toward texturing an ABS after machining, and not toward machining the ABS, in contrast to the above-incorporated U.S. patent. In other words, the present invention gently textures, i.e., roughens, the ABS of a magnetic head by making random small sub-micron pits uniformly across the surface of the ABS, in contrast to cutting a predetermined pattern into a head to render an ABS having a desired configuration. Thus, as used herein "texturing" means making random small sub-micron pits in a surface.

FIG. 1 also shows that the head substrate 12 is held by a head holder 22. In turn, the holder 22 is controlled by control elements 24 to load and process successive head substrates 12. Details of the holder 22 with control elements 24 are set forth in the above-incorporated U.S. patent. As disclosed therein, the holder 22 advances the head substrate 12 downwardly toward the sonitrode 14. With this orientation, the likelihood of contaminating the heads is reduced.

Figure 2:
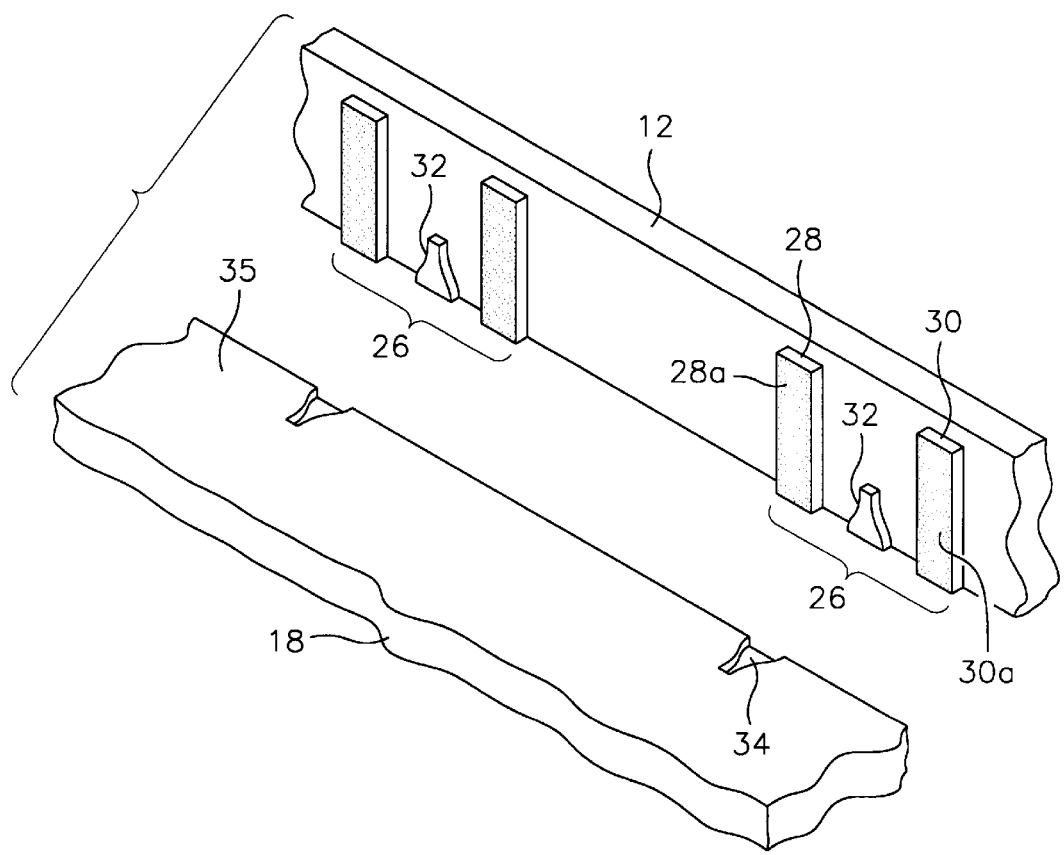
FIG. 2 is a perspective view of a head substrate including a row of magnetic heads rotated slightly away from a diamond die, showing the recesses in the die that are mirror images of the sensing elements of the heads, after texturing the ABS of the heads.

Now referring to FIG. 2, the head substrate 12 includes a plurality of heads 26. Those skilled in the art will recognize that after texturing, the heads 26 can be separated, and that the use of the head substrate 12 along with an elongated die 18 consequently permits simultaneous texturing of a plurality of heads 26.

In the exemplary embodiment shown in FIG. 2, each head 26 includes opposed elongated parallelepiped-shaped rails 28, 30 and a sensing element 32 positioned therebetween. Each rail 28, 30 defines a respective outwardly-facing (with respect to the head substrate 12) ABS 28a, 30a which, as shown in FIG. 2, has been textured by the process described below. It is to be understood that the principles of the present invention apply to heads having configurations that are different from the exemplary embodiment shown in FIG. 2.

Moreover, as intended by the present invention, the sensing element 32 is an example of a non-textured portion of the head 26, in that it is not desired to texture the sensing element 32. Accordingly, to avoid texturing the sensing element 32, the diamond die 18 is formed with a respective cavity 34 that is opposed to the sensing element 32. In accordance with the present invention, the cavity 34 is the mirror image of the sensing element 32.

On the other hand, the die 18 defines a flat texturing surface 35 that faces the ABS 28a, 30a of each head 26 and that is closely spaced therefrom, such that when the sonitrode 14 is vibrated, the texturing surface 35 of the die 18 agitates the slurry 20 to texture the ABS 18a, 20a. In the embodiment shown in FIG. 2, the texturing surface 35 is about the same area as the head substrate 12. It is to be understood, however, that the texturing surface 35 can be configured to be smaller, e.g., only as large as the ABS 28a, 30a of the heads 26. Stated differently, the texturing surface 35 of the die 18 can be a mirror image of the ABS 28a, 30a of the heads 26. With this structure, the slurry 20 (FIG. 1) that is between the diamond die 18 and ABS 28a, 30a will texture the ABS 28a, 30a as shown. On the other hand, with the above-described structure including the cavity 34, slurry pressure, and slurry composition, the sensing element 32 will not undesirably be textured.

Figure 3:
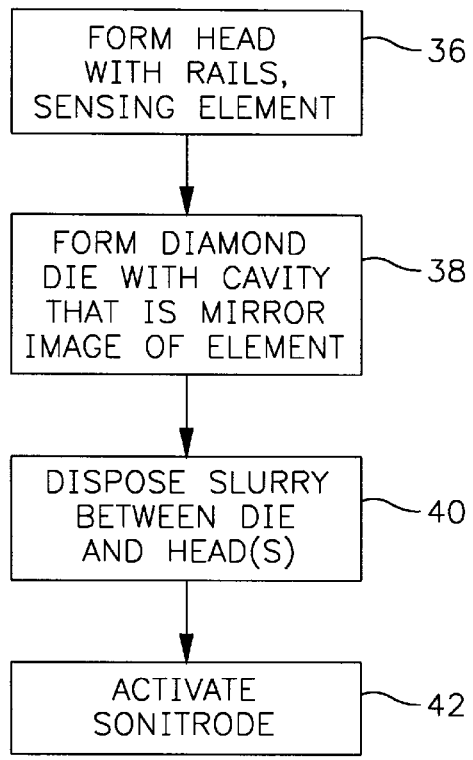
FIG. 3 is a flow chart showing the process steps for ultrasonically texturing the ABS of the heads.

FIG. 3 shows the process steps of the present invention to texture the ABS 28a, 30a of the heads 26 (FIG. 2) using the apparatus 10 (FIG. 1). At block 36, the desired configurations of the heads 26 on the head substrate 12 are established. In the exemplary embodiment shown, the desired configuration is a double-rail configuration with a sensing element between the rails as shown in FIG. 2, although other configurations can be used. A preferred method in establishing the configurations of the heads 26 is disclosed in detail in the above-incorporated U.S. Patent.

Once the head 26 configurations have been established, at block 38 the diamond die 18 is formed with the cavities 34. Recall that the cavities 34 are the mirror images of non-texture portions of the heads 26, e.g., the sensing elements 32. The preferred method for forming the cavities 34 is disclosed in the above-incorporated U.S. Patent.

Next, at block 40, the small-grit alumina slurry 20 is disposed between the die 18 and head substrate 12 at the above-disclosed fluid pressure. Then, at block 42, the sonitrode 14 is activated to ultrasonically agitate the slurry 20 and thereby texture the ABS 28a, 30a of the heads 26 without damaging the sensing elements 32. Preferably, ultrasonic vibrations of the sonitrode 42 is relatively low are within the parameter gauges set out previously in this description.

Figure 4:
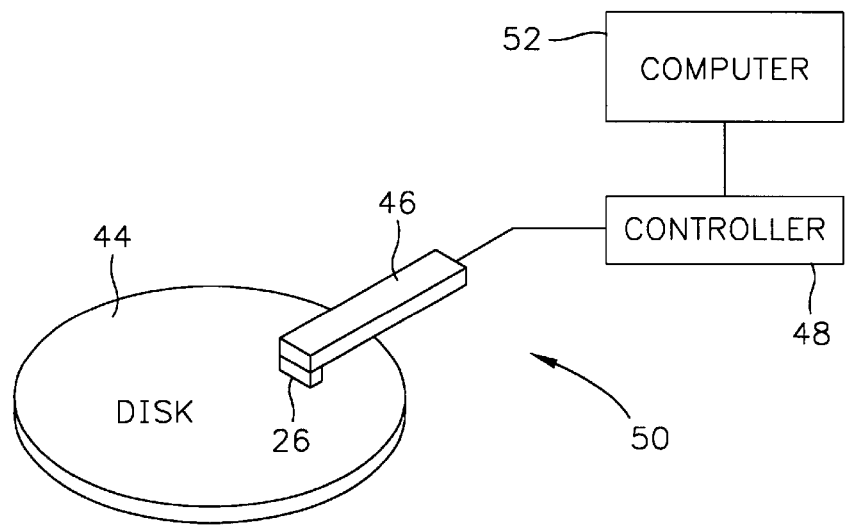
FIG. 4 is a perspective view of a hard disk drive and computer, incorporating a head having an ABS textured in accordance with the process shown in FIG. 3, with portions removed for clarity.

FIG. 4 shows that after texturing and separation from the head substrate 12, the head 26 can be closely juxtaposed with a hard disk 44 at a relatively low flying height, without stiction between the ABS of the head 26 and the disk 44. The head 26 is supported by a control arm 46, and the control arm 46 is controlled by a controller 48, in accordance with conventional principles. Together, the head 26, disk 44, control arm 46, and controller 48 establish a hard disk drive 50 which, as is well-known in the art, can include plural heads 26 and disks 44. In turn, the hard disk drive 50 can be associated with a computer 52 for data transfer therebetween. In the preferred embodiment, the computer 52 is a personal computer (PC) or laptop computer made by International Business Machines Corporation of Armonk, N.Y.

While the particular METHOD AND APPARATUS FOR ULTRASONIC TEXTURING OF ABS OF MAGNETIC HEAD OF HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A method for machining the air bearing surface (ABS) of a magnetic head with a sonitrode to thereby reduce stiction between the head and a data storage medium when the head is juxtaposed with the medium, comprising:

providing a head on a head substrate, the head including an ABS;

juxtaposing the sonitrode with the ABS;

disposing an alumina slurry having a grit size of less than one-half micron and a hardness of twenty-four hundred Knoop, or less, between the ABS and the sonitrode;

vibrating the sonitrode; and maintaining a slurry pressure against the ABS of one quarter (0.25 kg) of a kilogram of force, or less during vibrating;

whereby the vibrating roughens the ABS of making sub micron pits across the ABS.

2. The method of claim 1, wherein the head includes a non-textured portion, and the sonitrode is formed with a cavity, the cavity being a mirror image of the non-textured portion to avoid texturing the non-textured portion during vibrating.

3. The method of claim 1, wherein a plurality of heads are provided and the sonitrode is juxtaposed with the air bearing surfaces of the plurality of heads for texturing the heads simultaneously.

4. A head made by the method of claim 1.

5. The head of claim 4, in combination with a disk drive.

6. The combination of claim 5, further in combination with a computer.

7. In a method for machining an air bearing surface (ABS) of a head for reducing stiction between the head and a disk, an improvement comprising:

providing an alumina slurry having a grit size of less than one-half micron and a hardness of twenty-four hundred Knoop units, or less, at a slurry pressure equal to one quarter of a kilogram (0.25 kg) force, or less, over an area of the head substrate; and ultrasonically agitating the slurry against the ABS without placing a pattern in the ABS;

whereby the vibrating roughens the ABS by making sub micron pits across the ABS.

8. The method of claim 7, wherein the slurry includes a grit having a hardness of between nineteen hundred Knoop units and twenty four hundred Knoop units (1900–2400).

9. The method of claim 7, wherein the head is on a head substrate, and the slurry pressure during agitating is maintained over the area of the head substrate.

10. The method of claim 7, wherein the head includes a non-textured portion, and agitating is performed by a sonitrode having a cavity, the cavity being a mirror image of the non-textured portion to avoid texturing the non-textured portion during the agitating step.

11. The method of claim 7, wherein the sonitrode is juxtaposed with a plurality of heads for texturing the heads simultaneously.

12. A head made by the method of claim 7.

13. The head of claim 12, in combination with a hard disk drive.

14. The combination of claim 13, further in combination with a computer.

15. An apparatus for texturing the air bearing surface (ABS) of a magnetic head, comprising:

a sonitrode;

an alumina slurry at a pressure of one quarter of a kilogram of force (0.25 kg), or less, and having a grit size of less than one-half micron and a hardness of twenty-four hundred Knoop units, or less; and a holder engaged with the head such that the head is juxtaposed with the sonitrode with the slurry disposed between the head and sonitrode at a predetermined pressure.

16. The apparatus of claim 15, wherein the holder holds a plurality of heads for simultaneous texturing of the heads.

17. The apparatus of claim 16, further including a die acting between the sonitrode and the magnetic head, the die including at least one cavity for receiving an element of the head that is not to be textured.

* * * * *